3,371,125
NOVEL METHOD AND COMPOSITION
OF MATTER
Joseph Francis McMahon, Clinton, N.J., assignor to
Princeton Chemical Research, Inc., Princeton, N.J.,
a corporation of New Jersey
No Drawing. Filed Apr. 2, 1965, Ser. No. 445,238
20 Claims. (Cl. 260—669)

ABSTRACT OF THE DISCLOSURE

Oxidative dehydrogenation through the use of niobium catalyst. The specific catalyst is:

$$M_{6/x}O_3 \cdot Nb_2O_5 \cdot A_{2/y}O$$

in the metal atom ratios 0.05 to 10:1:0 to 2 respectively. M is tungsten or chromium, and A is alkali or alkaline earth metal. X and Y represent valences of their respective metals.

---

This invention relates to the oxidative dehydrogenation of hydrocarbons for the production of unsaturated hydrocarbons and the like. More specifically, this invention relates to dehydrogenation of alkylaromatic compounds to unsaturated alkylaromatics in the presence of oxygen, whereby sufficient heat is generated by the exothermic nature of the reaction, so as to reduce the external heat ordinarily required for the dehydrogenation. This invention also relates to novel catalysts utilized in promoting the dehydrogenation, whereby excellent selectivity and conversion are obtained.

It is known in the prior art that ethylbenzene compounds may be dehydrogenated to styrene at atmospheric pressure by externally supplying heat so as to bring the reactants up to a reaction temperature, usually temperatures of 600–650° C. In one process, superheated steam is mixed with 6–10 mol percent ethylbenzene to reduce the partial pressure of the hydrocarbon, supply heat for the endothermic reaction and to remove coke by the water-gas reaction, which is ordinarily deposited on the catalyst.

The superheated steam, mixed with ethylbenzene, is usually at about 710° C., while the ethylbenzene is preheated to 500° C. The mixture enters the base of a fixed bed reactor at 600 to 620° C. The inlet temperature is usually raised to 660° C., however, as the catalyst ages and loses some of its activity. The heated ethylbenzene is passed through the reactor at a space velocity of approximately 0.7 to 1.0 v./hr./v., which is defined as liquid volumes of reactant at Standard Temperature and Pressure per hour per volume of catalyst. The products of the reaction leave the reactor at 560° C., are cooled, passed through a spray column and condensed in a heat exchanger. Water and oil phases thus obtained are separated in a gravity separator, while non-condensed gases are compressed and chilled to obtain maximum recovery of aromatic hydrocarbon by-products.

In a conventional or non-oxidative dehydrogenation process the feed is pre-heated somewhat above reaction temperature. The major portion of the conversion occurs in the inlet portion of the catalyst bed, since the reaction is endothermic and as the reactants move along the catalyst bed they are progressively cooler. This type of temperature profile results in poor performance because of two effects. At these lower temperatures, the rate of reaction of ethylbenzene is naturally low. Furthermore, the equilibrium for the dehydrogenation reaction becomes less favorable at the low temperature. Hence, conversion is quite limited in this type of process. If the temperature in the inlet portion of the bed is raised, cracking and coking become extensive and prevent non-regenerative operation. Control of the temperature near the exit section of the catalyst bed by external heating is not easily accomplished. Liquid heating media are not stable at these high temperatures; close control by gaseous fluids is difficult.

Catalysts generally used consist of the oxides of iron, potassium, magnesium and copper. Other commercially available catalysts include iron oxide promoted with potassium carbonate and chromium oxide. Additionally, calcium-nickel-phosphate catalysts are used to this end. Ordinarily, these catalysts operate non-regeneratively with a life of approximately one year. Commercial operations are benefitted by catalysts and processing conditions which yield a selectivity of 85 percent or better and overall conversion of 50 percent or better, however, these conditions are not always achieved. In fact, typical commercial conversion values are only 35–40 percent.

The chemistry of dehydrogenation, as illustrated by the production of styrene by dehydrogenation of ethylbenzene, may best be represented by the equilibrium reaction:

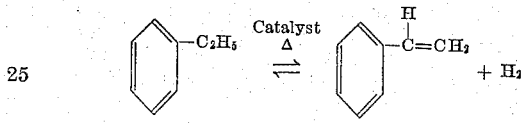

Thus, it can be seen that the conversion is limited by chemical equilibrium. With this limited conversion of the feed, recycling of the ethylbenzene is required, necessitating costly separation facilities.

More efficient methods are directed to removal of hydrogen to promote a shift in the equilibrium to favor production of the unsaturated hydrocarbon. Oxidative dehydrogenation reactions in which oxygen is added to the system in the presence of a suitable catalyst, avoid the equilibrium limitation imposed upon the dehydrogenation reaction as illustrated by the following reaction:

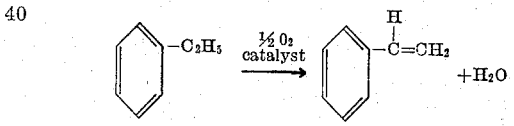

and higher conversions to alkyl benzenes such as styrene are thus possible without extensive recycling of ethylbenzene.

Basically, two types of oxidative dehydrogenation systems are known in the prior art. In one system, ethylbenzene and oxygen are reacted in the presence of a halogen, such as iodine, bromine or chlorine. Generally, a solid catalyst is also employed. The other system involves addition of oxygen to the hydrocarbon feed in the absence of any halogen additive. This reaction is also carried out in the presence of a solid catalyst. The former process involves conversions of ethylbenzene to styrene in the presence of molten lithium iodide at conversion temperatures of 543° C. and oxygen-ethylbenzene ratio of 0.45, whereby a liquid product is obtained containing 23 percent ethylbenzene and 77 percent styrene. Lithium iodide is subsequently converted into lithium oxide and iodine by oxidation, whereby the iodine produced effects the dehydrogenation and hydrogen iodide is produced as a by-product. Hydrogen iodide and lithium oxide subsequently react to form the starting material lithium iodide. The iodine catalyst is thus formed in situ. The catalyst and molten lithium iodide and lithium oxide, however, are highly corrosive and, consequently, difficult to handle.

The production of α-methylstyrene and styrene may be effected by the latter process in the presence of gaseous iodine by conversion of isopropylbenzene and ethylbenzene to the extent of 36 percent and 29 percent respectively, at selectivities of approximately 40 percent at 700° C. and oxygen-feed ratios of 0.5. Halogen-containing compounds, however, are also produced with the styrene and are undesirable because of difficulties in purifying the unsaturated hydrocarbons produced. The relatively low yields obtained also make this process commercially undesirable.

In a non-halogen system, calcium-nickel-phosphate catalysis of ethylbenzene at 500° C. is effected for the production of styrene. Conversions to styrene may be increased from 36 percent to 45 percent by the addition of 0.15 moles of oxygen per mole of ethylbenzene feed, according to the process; however, selectivity decreases from 88 percent to 86 percent. Addition of oxygen to the feed at higher temperatures results in a higher loss of selectivity. This and maximum conversions of 45 percent make this process undesirable from a commercial standpoint.

Thus, the prior art catalyst precursors such as lithium oxide/lithium iodide in a molten condition are difficult to handle because of their corrosive nature. Halogen catalysts or processes present a difficulty of halogen-contamination of the unsaturated products. Additionally, some of these processes result in conversions lower than 50 percent and selectivities lower than 85 percent, which make them commercially undesirable. Additionally, prior art systems are characterized by the application of externally supplied heat to initiate and maintain the dehydrogenation.

It is therefore an object of this invention to provide a novel method and catalyst for the oxidative dehydrogenation of alkyl-cycloaliphatic and alkyl-aromatic organic compounds at selectivities of 85 percent and greater and a conversion of 50 percent and greater, where styrene is obtained, and at least 25 percent conversion at selectivities of 50 percent where styrene derivatives are obtained.

Another object of this invention is to provide a process for the oxidative dehydrogenation of alkyl-aromatic compounds for the production of styrene and its homologues and analogues.

A further object of this invention is to maintain the reactor temperature in such a process while introducing a minimum of heat.

Additionally, it is an object of this invention to maintain a balance between the heat absorbed and the heat produced in the oxidative dehydrogenation reaction of this invention.

It is a further object of this invention to provide an oxidative dehydrogenation catalyst that is relatively simple to manufacture and use.

It is a further object of this invention to provide a novel oxidative dehydrogenation catalyst free from halogens.

These and other objects of the invention have been accomplished by the dehydrogenation of organic compounds of the formula

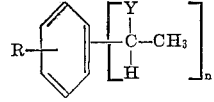

where R=any organic compound or hydrogen, n=1–3, and Y=methyl or hydrogen, or of the formula

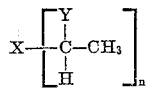

where X=aromatic or heterocyclic compound, n=1–3, and Y=methyl or hydrogen by means of a novel catalyst. This invention is particularly directed to the oxidative dehydrogenation of the above compounds; more specially, this invention is directed to the dehydrogenation of organic precursors of styrene, its homologues and analogues within the definition of the above formulae, preferably by the oxidative dehydrogenation techniques and by means of a novel catalyst. Any combination of the above reactants is also suitable for the purpose of this invention.

The process of this invention is especially directed to the dehydrogenation of ethylbenzene to form styrene and isopropylbenzene to form α-methyl styrene or their homologues and analogues by dehydrogenation of their hydrogenated precursors.

The reaction is promoted by a catalyst comprising the oxides or niobium combined with the oxides of chromium or tungsten and, optionally, containing at least one member selected from the group consisting of the oxides of the alkali metals or alkaline earth metals. The composition of the catalyst may be varied from 0.05 atoms of chromium or tungsten per atom of niobium to 10.0 atoms of chromium or tungsten per atom of niobium and from 0.01 atom of alkali metal or alkaline earth metal per atom of niobium to 2 atoms of alkali metal or alkaline earth metal per atom of niobium. The catalyst may be used without a support or may be coated or deposited on an inert support such as fused alumina, silicon carbide, alumina or silica gel, etc. The catalyst may be used in the form of granules of pellets in a fixed bed reactor or may be used in the form of powder in a fluid bed reactor.

The catalyst of this invention may be characterized by formula:

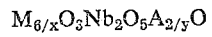

in the metal atoms ratios of 0.05 to 10:1:0 to 2 respectively, where M is selected from at least one member of the group consisting of chromium and tungsten and $x$ is the valence of M, and A is selected from at least one member of the group consisting of alkali metals and alkaline earth metals, and $y$ is the valence of A.

The conversion is conducted at temperatures of 400 to 750° C. and oxygen to hydrocarbon mole ratio of 0.05 to 1.0, particularly 0.7 to 2.8 liquid volumes of hydrocarbon feed per hour per volume of catalyst. Oxygen is normally added as air; however, pure oxygen or oxygen in combination with a diluent gas can also be used. The entire oxygen-containing gas may be added to the reactor inlet, or oxygen-containing gas may be injected at a number of points along the reaction zone to reduce the selectivity to carbon oxides.

Concentration of hydrocarbon in the total reactor feed may be varied from 1 mole percent to 50 mole percent, although about 10–20 mole percent is normally used. Concentration of hydrocarbon in the total reactor feed may be adjusted by the addition of steam.

The hydrocarbon conversion may be carried out by feeding hydrocarbon-oxygen-diluent mixture to the catalyst zone for a period of 10 minutes to 10 hours, after which the feed mixture is stopped and the catalyst is regenerated with air, whereby carbon deposits on the catalyst are removed as carbon oxides. Alternately, the hydrocarbon conversion may be carried out non-regeneratively, whereby hydrocarbon-oxygen-diluent mixture is fed continuously to the catalyst zone without intermittent periods of regeneration. With non-regenerative operation, it is generally advantageous to use steam as a portion of the inert diluent.

The hydrocarbon feed and oxygent are mixed in the proper mole ratios before being introduced into a catalytic reaction chamber, or may be introduced separately. The ingredients may be heated by means of steam or other heat sources prior to introduction into the catalytic chamber. Alternately, the reactants may be brought into contact with the catalyst at ambient temperatures and heat supplied to the reaction chamber. The exothermic nature of the oxidative dehydrogenation, wherein water is produced as one of the by-products, enables the reaction to be conducted with substantially lower quantities of external heat. The exotherm which results from the oxidation of the hydrogen by-product of the reaction, is used to maintain the hydrocarbon at the reaction temperature required for dehydrogenation, along with externally introduced heat.

While the conventional process is limited by reaction and equilibrium considerations, the process of this invention permits maintaining temperature in the bed at a more nearly constant level, effecting high rates and elimination of equilibrium restrictions by conversion of hydrogen to water.

It was observed that, when using the catalyst and method of this invention, the activation energy for the oxidative dehydrogenation of hydrocarbons was substantially lower than in the non-oxidative process. For example, with ethylbenzene, the activation energy for the reaction in the absence of oxygen is 29.1 kilocalories. Activation energies for the oxidative dehydrogenation of ethylbenzene using oxygen/ethylbenzene ratios of 0.17, 0.25 and 0.50, was 22 kilocalories, the significant feature of this discovery being that the present invention permits the oxidative dehydrogenation of various hydrocarbons at considerably lower heat imputs than by previously known methods, and thus represents a substantial savings in fuel, especially in commercial operations.

The catalysts of this invention are prepared by reacting proportionate amounts of soluble catalytic oxide precursor compounds in solution for a length of time so that a precipitate is formed after which the precipitate is calcined. The calcined precipitate may be further treated with $K_2O$ or other alkali and/or alkaline earth metal oxide precursors such as a water solution of potassium hydroxide, alcoholic potassium hydroxide and the like, where catalysts containing potassium are to be prepared. The alkali metals used in this regard comprise Li, Na, K, Rb and Cs, whereas the alkaline earth metals comprise Ca, Sr, and Ba. Other operable Group I-A and II-A elements, e.g., Be, Mg and Ra, corresponding to the above alkali and alkaline earth metals, may be used. Any combination of the above alkali and/or alkaline earth metals may be used in addition to any combination of the above elements referred to. The above alkali and/or alkaline earth compounds will be referred to in the specification and claims hereof as "alkaline compounds." Precipitates treated in such a manner are calcined a second time.

Ammonium hydroxide is conveniently added to the metal oxide precursors to adjust pH of the solution to facilitate precipitation.

The oxide precursor compounds referred to generally comprise the organic and inorganic salts of the catalyst metals, such as the nitrates and oxalates of chromium and niobium, or ammonium salts of the catalyst metals, such as ammonium tungstates or chormates. Other metal oxide precursor compounds are suitable so long as they are soluble. Thus, for example, $W_2O_3 \cdot Nb_2O_5$ catalysts are prepared from ammonium metatungstate and niobium oxalate, and $Cr_2O_3 \cdot Nb_2O_5$ catalysts are prepared from ammonium dichromate or chromium nitrate and niobium oxalate.

The reaction may be conducted so that the external heat added to initiate the dehydrogenation, may be reduced in an amount inversely proportional to the quantity of oxygen used. This relation will be defined for the purpose of this invention in terms of "percent heat balance," which is the percent of the endothermic heat of dehydrogenation required for ethylbenzene and its equivalents enumerated herein, which is supplied by the heat released during the combination by-product of hydrogen with oxygen.

Thus, the heat balance may vary from 0-200 percent, and preferably 20-180 percent, or from 50-150 percent. Twenty to 180 percent heat balance corresponds to approximately 10-90 percent reaction of hydrogen with oxygen in the case of ethylbenzene feed, and 50-150 percent heat balance to approximately 25-75 percent reaction of hydrogen. Similarly, 0-200 percent heat balance indicates that the reaction may be conducted without oxygen, or with sufficient oxygen to convert all hydrogen released from the reaction to water. Thus, the heat balance is partially controlled by the addition of oxygen, and such oxygen addition may be expressed in terms of heat balance, i.e., 0-200 percent, 20-180 percent and 50-150 percent.

The hydrocarbon conversions and selectivities vary such that, where styrene is obtained, conversions approximately comprising at least 50 percent at selectivities of at least 85 percent are obtained. Conversions of hydrocarbons to styrene derivatives comprise at least 25 percent at selectivities of at least 50 percent.

The various catalysts used for the dehydrogenation of hydrocarbons, along with various conversion procedures, are more fully described in the following non-limiting examples which are given as certain preferred embodiments and illustrations of the invention, and are not to be construed as narrowing the novel and inventive method and composition of matter of the applicant. Unless otherwise specified, nitrogen is used as the diluent gas in all examples and all "ratios" are molar ratios.

*Examples I and II.—Tungsten-niobium catalysts*

Catalysts containing tungsten and niobium are prepared by mixing solutions of ammonium metatungstate and niobium oxalate, evaporating excess water, drying and calcining at 500° C. Catalysts containing W/Nb ratios from 0.8 to 8.5 are thus prepared.

Conversion of ethylbenzene (EB) with these catalysts is conducted at temperatures of 675 and 700° C., a space velocity of 1.3 v./hr./v. and $O_2$/ethylbenzene ($O_2$/EB) ratios of 0.25 and 0.50. Conversions and selectivities obtained at 675 and 700° C. are given below:

| Ex. | Catalyst | $O_2$/EB | 675° C. | | 700° C. | |
|---|---|---|---|---|---|---|
| | | | Percent Conv. | Percent Selec. | Percent Conv. | Percent Selec. |
| I | $1.0WO_3 \cdot 0.6Nb_2O_5$ | 0.25 | 47 | 84 | 56 | 83 |
| II | $1.0WO_3 \cdot 1.0Nb_2O_5$ | 0.25 | 43 | 83 | 54 | 83 |

It can be seen from the above data that tungsten-niobium catalysts give conversions of 43-56 percent and selectivities of 83-84 percent. Catalysts containing V/Nb ratios of 1.0 and 0.5 are similar in both activity and selectivity. Furthermore, tungsten-niobium catalysts have about the same activity, but unexpectedly higher selectivity than iron-niobium catalysts.

*Examples III-VI.—Chromium-niobium catalysts*

Two series of chromium-niobium catalysts are prepared. In the first series solutions of ammonium dichromate and niobium oxalate are mixed and excess water evaporated. The solids are dried and calcined at 750° C. Catalysts containing Cr/Nb ratios of 0.2, 0.33, 0.5, and 1.0 are prepared in this manner.

Conversion of ethylbenzene with these catalysts is carried out at temperatures of 650-700° C., space velocities of 1.0-1.3 v./hr./v. and $O_2$/ethylbenzene ratios of 0.15 to 0.90. Conversions and selectivities obtained at 700° C. are compared below:

| Ex. | Catalyst | Space Veloc., v./hr./v. | $O_2$/EB | 700° C. Percent Conv. | 700° C. Percent Selec. |
|---|---|---|---|---|---|
| III | $1.0Cr_2O_3 \cdot 5Nb_2O_5$ | 1.3 | 0.25 | 45 | 83 |
| IV | $1.0Cr_2O_3 \cdot 3.0Nb_2O_5$ | 1.0 | 0.25 | 59 | 85 |
| V | $1.0Cr_2O_3 \cdot 2.0Nb_2O_5$ | 1.2 | 0.25 | 58 | 84 |
| VI | $1.0Cr_2O_3 \cdot 1.0Nb_2O_5$ | 1.5 | 0.25 | 43 | 82 |

Thus, catalysts containing Cr/Nb ratios of 0.33 and 0.50 give conversions of about 59 percent and selectivity of 84–85 percent. Catalysts containing Cr/Nb ratios of 0.2 and 1.0 give lower conversions and slightly lower selectivities. Chromium-niobium catalysts prepared using ammonium dichromate solution are comparable in activity and selectivity to tungsten-niobium catalysts.

Example VII

A second series of chromium-niobium catalysts are prepared by adding an ammonium hydroxide solution to a solution of chromium-nitrate and niobium oxalate. The resulting precipitate is filtered, dried, and calcined at 500° C. A catalyst having Cr/Nb ratio of 1.67 is thus prepared.

Conversion of ethylbenzene with this catalyst is carried out at temperatures of 625–725° C. space velocities of 0.7 to 2.8, and $O_2$/ethylbenzene mole ratios of 0.15 to 0.50. Conversion and selectivity obtained at 700 C. is given below:

Ex. VII:
Catalyst _____ $1.0Cr_2O_3 \cdot 0.6Nb_2O_5$
Space veloc., v./hr./v. _____ 1.2–1.4
$O_2$/EB _____ 0.25
Conv., percent (700° C.) _____ 63
Selec., percent (700° C.) _____ 82–85

Activity of chromium-niobium catalysts prepared from chromium nitrate increases as the Cr/Nb ratio decreases from 5.0 to 0.5, while selectivity of all catalysts of these varying mol ratios is in the range of 79–85 percent.

Activity and selectivity of chromium-niobium catalysts prepared from ammonium dichromate and chromium nitrate indicate that the nitrate-prepared catalyst is more active than catalysts prepared from the dichromate. Highest activity in the nitrate series of catalysts is obtained in the composition range corresponding to Cr/Nb ratios of 0.6 to 1.0.

Generally speaking, the styrene selectivity of catalysts prepared from either the dichromate or chromium nitrate are similar when compared at constant temperature and space velocity. The catalyst prepared by the nitrate method, however, is more selective, generally speaking, than the catalyst prepared by the dichromate method, when the two are compared at constant conversion ratios.

Example VIII

A commercially available calcium-nickel-phosphate catalyst was tested for oxidative dehydrogenation of ethylbenzene at temperatures of 650 and 700° C. When oxygen was not added to the feed (reactants), conversions of 20 percent and selectivity to styrene of 92 percent was obtained at 650° C. Addition of oxygen to the feed, equivalent to oxygen/ethylbenzene ratios of 0.5 at 650° C., increased conversion to 44 percent, however, selectivity to styrene decreased from 92 percent to 83 percent. At 700° C. and an oxygen/ethylbenzene mole ratio of 0.5, 55 percent conversion and 85 percent selectivity were obtained.

Examples IX and X

It has been found that a chromium-niobium catalyst, treated with potassium hydroxide, effects conversion of hydrocarbons, such as ethylbenzene, to styrene at temperatures lower than 700° C., with a minimal quantity of cracking products and coke, as compared to similar catalysts containing no potassium.

Thus, a catalyst is prepared by adding an ammonium hydroxide solution to a solution of chromium nitrate and niobium oxalate. The resultant precipitate is filtered, dried and calcined at 500° C. A solution of potassium hydroxide in water is then added to the precipitate and is dried and calcined a second time. The catalyst thus prepared comprises $Cr_2O_3 \cdot Nb_2O_5 \cdot K_2O$ in a mole ratio of 1:1:0.2 respectively.

The catalyst comprising the oxides of niobium, chromium and potassium thus prepared is utilized in promoting the conversion of ethylbenzene to styrene. The conditions and results of the conversion are given below:

| Catalyst | $1.0Cr_2O_3 \cdot 1.0Nb_2O_5 \cdot 0.2K_2O$ | |
|---|---|---|
| Temperature | 700 | 650 |
| Space Velocity, v./hr./v. | 0.7 | 0.6 |
| $O_2$/EB, mole ratio | 0.2 | 0.2 |
| Percent Conversion | 83 | 67 |
| Percent Selectivity to — | | |
| Styrene | 59.8 | 89.9 |
| Benzene+Toluene | 25.0 | 5.5 |
| Coke | 11.3 | 3.5 |
| $C_1$-$C_3$ | 2.8 | 0.3 |
| $CO_2$+CO | 1.1 | 0.8 |

The above results indicate that chromium-niobium catalysts containing potassium oxide are not only approximately twice as active as the calcium-nickel-phosphate catalysts of Example VIII, but also, at 650° C., the catalysts containing potassium effected a 67 percent conversion of ethylbenzene to styrene at 90 percent selectivity, whereas the calcium-nickel-phosphate catalysts only gave 80 percent selectivity under comparable conditions. The conversion obtained with the above chromium-niobium-potassium catalyst is approximately one-and-a-half to twice that obtained in commercial operations. It can therefore be seen that this novel catalyst and method represent a significant advance in the state of the art.

Example XI

The following examples illustrate space velocity required to obtain 85 percent conversion of ethylbenzene with a catalyst comprising $1.0Cr_2O_3 1.0Nb_2O_5$. The method of Example I was utilized in obtaining the results tabulated below.

| | Space Velocity Req'd for 85% Conv., v./hr./v. $O_2$/ethylbenzene ratio | | |
|---|---|---|---|
| | 0 | 0.25 | 0.50 |
| Temperature: | | | |
| 700 | 0.79 | 0.83 | 0.95 |
| 650 | 0.37 | 0.43 | 0.53 |
| 600 | 0.15 | 0.22 | 0.30 |

It can be seen from the above table that at 700° C. addition of 0.5 moles of oxygen increased catalyst activity by about 20 percent, compared to oxygen-free operations. At 600° C., addition of 0.5 moles of oxygen increased the catalyst activity by 100 percent.

Example XII

Chromium-niobium catalysts containing an alkali metal oxide are prepared by treating a chromium niobium catalyst with a solution of an alkali metal salt. The impregnated catalyst is dried and calcined at 500° C. Catalysts thus prepared comprise $Cr_2O_3 \cdot Nb_2O_5 \cdot K_2O$, $Cr_2O_3 \cdot Nb_2O_5 \cdot Rb_2O$ and $Cr_2O_3 \cdot Nb_2O_5 \cdot Cs_2O$ in a mole ratio of 1.1:1.0:0.175 respectively.

Conversion of ethylbenzene with these catalysts is effected at a temperature of 650° C., space velocity of 0.60 liquid volumes per hour per volume of catalyst, $O_2$/ethylbenzene mole ratio of 0.20 and 10 percent concentration of ethylbenzene in the feed. Nitrogen or steam is used as a diluent. Conversions and selectivities obtained are given below:

| Catalyst | $Cr_2O_3 \cdot Nb_2O_5 \cdot$ 0.175 $K_2O$ | | $Cr_2O_3 \cdot Nb_2O_5 \cdot$ 0.175 $Rb_2O$ | | $Cr_2O_3 \cdot Nb_2O_5 \cdot$ 0.175 $Cs_2O$ | |
|---|---|---|---|---|---|---|
| Diluent | $N_2$ | Steam | $N_2$ | Steam | $N_2$ | Steam |
| Temperature, °C | 650 | 650 | 650 | 650 | 650 | 650 |
| Space Velocity | 0.6 | 0.6 | 0.6 | 0.6 | 0.6 | 0.6 |
| $O_2$/Ethylbenzene, mole ratio | 0.2 | 0.2 | 0.2 | 0.2 | 0.2 | 0.2 |
| Percent Conversion | 65 | 57 | 74 | 67 | 41 | 52 |
| Percent Styrene Selectivity | 86 | 85 | 82 | 84 | 86 | 80 |

Example XIII

This example clearly illustrates the beneficial role of oxygen in the feed. Using a $Cr_2O_3 \cdot Nb_2O_5 \cdot 0.18Rb_2O$ catalyst at 650° C., with ethylbenzene feed at 0.6 lv./v./hr., and a 10-percent (mole) concentration of hydrocarbon in the feed with steam diluent, the following values are obtained:

| | Oxygen/ethylbenzene ratio | |
|---|---|---|
| | 0 | 0.2 |
| Percent ethylbenzene conversion | 36.7 | 67 |
| Percent selectivity: | | |
| Styrene | 83.8 | 83.8 |
| Benzene and toluene | 10.2 | 11.8 |
| Coke | 3.2 | 0.32 |

Thus, by introducing in the feed oxygen, conversion is nearly doubled and styrene selectivity is maintained at 83.8 percent. Coke formation is reduced tenfold.

Example XIV

A pelleted catalyst, whose composition is $$1CrO_3 \cdot 2Nb_2O_5 \cdot 0.35K_2O$$

is evaluated for the oxidative dehydrogenation of β-ethylnaphthalene, designated "EN" below.

Reaction conditions according to the method of the invention are as follows:

Temperature _____ °C__ 625
Space velocity _____ v./hr./v__ 0.8
$O_2$/EN mole ratio _____ 0.4
Percent EN in feed (steam diluent) _____ 12

Conversion of the ethylnaphthalene is 46 percent; selectivity for β-vinylnaphthalene is 81 percent. The selectivity value for $CO+CO_2$ formation is 7 percent.

Example XV

Ethyl heterocyclic compounds are used to evaluate a supported oxidative dehydrogenation catalyst deposited on α-alumina. The catalyst composition is $$Cr_2O_3 \cdot 4Nb_2O_5 \cdot 0.15K_2O$$

Reaction conditions, according to the method of the invention are as follows:

Space velocity _____ v./hr./v__ 0.8
Percent concentration of organic in feed (steam diluent) _____ 10
$O_2$/heterocyclic mole ratio _____ 0.25

The following results are obtained:

| Compound | Optimum Temp., °C. | Percent Conv. | Percent Selectivity | |
|---|---|---|---|---|
| | | | Vinyl Heterocyclic | $CO+CO_2$ |
| 2-ethylpyridine | 625 | 51 | 81 | 6 |
| 2-ethylthiophene | 585 | 74 | 69 | 22 |

No indication of catalyst poisoning is detected.

Example XVI

A feed containing a mixture of m+p-diethylbenzene is dehydrogenated over the $1.0WO_3 \cdot 1.0Nb_2O_5$ catalyst of Example II. Conversion with this catalyst is conducted at 675 and 700° C., at a space velocity of 0.6 v./hr./v. and $O_2$/DEB mole ratio of 0.52. The results obtained are as follows:

| | Percent Conversion | Percent Selectivity | |
|---|---|---|---|
| | | Divinyl-benzene | Ethylvinyl benzene |
| Temperature, °C.: | | | |
| 675 | 47 | 31 | 57 |
| 700 | 61 | 61 | 21 |

Although the previous examples relate to the conversion of organic compounds by oxidative dehydrogenation, the conversion of other compounds is also contemplated and include: ethane, propane, propene, n-butane, butene, isobutane, n-pentane, 1-pentene, 2-pentene, isopentane, 3-methyl-2-butene, n-hexane, hexene, n-heptane, monomethylhexane, monomethylhexene, n-octane, n-octene, monomethylheptane, dimethylhexane, n-decane, 5-methylnonane, 2,2,3-trimethylpentane, 2,4,4-trimethylpentene, cyclopentane, cyclopentene, methylcyclopentane, cyclohexane, methylcyclohexane, ethylcyclohexane, 1,3-dimethylcyclohexane, 1,4-dimethylcyclohexane, n-propylbenzene.

Thus, there has been described and illustrated a novel and inventive catalyst and method for the oxidative dehydrogenation of various organic compounds. A preferred catalyst for conducting the reaction comprises a mixture of the oxides of chromium or tungsten, niobium and potassium. The selectivities and conversions obtained with this particular catalyst are higher than those achieved with prior art processes and catalysts. The reaction is further characterized by an exotherm sufficient to reduce the total quantity of external heat required to maintain the reaction temperatures.

Although the invention has been described with reference to certain preferred embodiments, it is not the applicant's intention to be limited thereby, and certain obvious modifications of the novel catalyst and method are intended to be included within the broad scope of the invention, as embodied in the following claims.

What is claimed is:

1. A dehydrogenation catalyst comprising $$M_{6/x}O_3 \cdot Nb_2O_5 \cdot A_{2/y}O$$

in the metal atom ratios 0.05 to 10:1:0 to 2 respectively, where M is at least one member selected from the group consisting of chromium and tungsten, $x$ is the valence of M, A is at least one member selected from the group consisting of alkali and alkaline earth metals and $y$ is the valence of A.

2. Catalyst as claimed in 1 wherein M is tungsten and A is potassium.

3. A method for manufacturing a $$M_{6/x}O_3 \cdot Nb_2O_5 \cdot A_{2/y}O$$

dehydrogenation catalyst in the metal atom ratios 0.05 to 10:1:0 to 2 respectively, where M is at least one member selected from the group consisting of chromium and tungsten and $x$ is the valence of M, A is at least one member selected from the group consisting of alkaline earth metals and alkali metals and $y$ is the valence of A, comprising dissolving amounts of soluble oxide precursors in an amount sufficient to produce a product having said atom ratios of both M and niobium in a solvent, reacting said precursors until a precipitate forms, calcining said precipitate, adding an amount of an oxide precursor in an amount sufficient to produce a product having said atom ratios of A to said calcined precipitate and calcining said precipitate having said oxide precursors of A added thereto.

4. The method of claim 3, where said soluble oxide precursors of M, Nb and A are salts.

5. The method of claim 4, where said salts are inorganic salts.

6. The method of claim 5, where said soluble oxide precursor of M is chromium nitrate.

7. The method of claim 5, where said soluble oxide precursor of M is ammonium chromate.

8. Process of producing ethylenically unsaturated materials which comprises contacting oxygen and a compound of the formula:

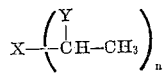

wherein X is an aromatic or heterocyclic group; Y is selected from the group consisting of methyl and hydrogen, and $n$ is 1 to 3 together in the presence of a catalyst as claimed in claim 1 at about 400 to 750° C. for a time sufficient to dehydrogenate said compound.

9. Process as claimed in claim 8, wherein said compound is at least one selected from the group consisting of ethyl benzene, isopropylbenzene, 2-ethylpyridine, 2-ethylthiophene and diethyl benzene.

10. Process as claimed in claim 8 wherein M is tungsten.

11. Process as claimed in claim 8 wherein M is chromium.

12. Process as claimed in claim 8 wherein A is potassium.

13. Process as claimed in claim 8 wherein said catalyst is $1.0WO_3 \cdot 0.6Nb_2O_5$.

14. Process as claimed in claim 8 wherein said catalyst is $1.0Cr_2O_3 \cdot 5Nb_2O_5$.

15. Process as claimed in claim 8 wherein said catalyst is $1.0Cr_2O_3 \cdot 3Nb_2O_5$.

16. Process as claimed in claim 8, carried out in the presence of sufficient oxygen to maintain a 20 to 180 percent heat balance.

17. Process as claimed in claim 8 carried out at a space velocity of about 0.1 to 10 v./hr./v.

18. Process as claimed in claim 8 wherein said catalyst is coated on a substrate.

19. Process as claimed in claim 18 wherein said support is at least one selected from the group consisting of silicon carbide, alumina, silica gel and fused alumina.

20. Process of oxidatively dehydrogenating at least one compound selected from the group consisting of ethane, propane, propene, n-butane, butene, isobutane, n-pentane, 1-pentene, 2-pentene, isopentene, 3-methyl-2-butene, n-hexane, hexene, n-heptane, monomethylhexane, monomethylhexene, n-octane, n-octene, monomethylheptane, dimethylhexane, n-decane, 5-methylnonane, 2,2,3-trimethylpentane, 2,4,4-trimethylpentene, cyclopentane, cyclopentene, methylcyclopentane, cyclohexane, methylcyclohexane, ethylcyclohexane, 1,3-dimethylcyclohexane, 1,4-dimethylcyclohexane, n-propylbenzene, which comprises contacting such compound with oxygen in the presence of a catalyst as claimed in claim 1 at an elevated temperature for a time sufficient to increase the ethylenic unsaturation of said compound.

References Cited
UNITED STATES PATENTS 3,308,196   3/1967   Bajars  ---------- 260—669 X
3,308,200   3/1967   Bajars  ---------- 260—669 X DELBERT E. GANTZ, *Primary Examiner.*

PAUL M. COUGHLAN, JR., *Examiner.*

C. R. DAVIS, *Assistant Examiner.*

UNITED STATES PATENT OFFICE
CERTIFICATE OF CORRECTION

Patent No. 3,371,125　　　　　　　　　　　　　February 27, 1968

Joseph Francis McMahon

It is certified that error appears in the above identified patent and that said Letters Patent are hereby corrected as shown below:

Column 4, line 32, "atoms" should read -- atom --; line 65, "oxygent" should read -- oxygen --. Column 5, line 23, "imputs" should read -- inputs --; line 38, "Be, Mg and Ra" should read -- H, Fr, Be, Mg and Ra --; line 64, "chormates" should read -- chromates --. Column 6, line 60, "V/Nb" should read -- W/Nb --. Column 10, line 4, "dihydrogenated" should read -- dehydrogenated --.

Signed and sealed this 2nd day of December 1969.

(SEAL)

Attest:

Edward M. Fletcher, Jr.　　　　　　　　　　　　WILLIAM E. SCHUYLER, JR.

Attesting Officer　　　　　　　　　　　　　　　Commissioner of Patents